United States Patent [19]

Rosell

[11] 3,905,277

[45] Sept. 16, 1975

[54] SERVO-ASSISTED STEERING MECHANISM

[75] Inventor: Jorge Estela Rosell, Barcelona, Spain

[73] Assignee: Bendeberica S.A., Spain

[22] Filed: Dec. 27, 1973

[21] Appl. No.: 428,841

[30] Foreign Application Priority Data

Jan. 13, 1973 Spain .................................. 410896

[52] U.S. Cl. ..................................... 91/400; 91/437
[51] Int. Cl.² ........................................ F15B 15/22
[58] Field of Search ............. 91/437, 438, 439, 400, 91/401

[56] References Cited
UNITED STATES PATENTS

| | | | |
|---|---|---|---|
| 3,252,380 | 5/1966 | Jablonsky et al. ..................... | 91/400 |
| 3,315,570 | 4/1967 | Brewer et al. ......................... | 91/401 |
| 3,602,101 | 8/1971 | Jablonsky ............................. | 91/437 |

Primary Examiner—Paul E. Maslousky
Attorney, Agent, or Firm—Steinberg & Blake

[57] ABSTRACT

A servo-assisted steering mechanism, especially for vehicles, of the type having a double-acting piston which is moved in dependence on the steering action of the mechanism, pressurized fluid being selectively fed to opposite ends of the piston to urge it in the appropriate direction so as to provide servo-assistance of the steering action, has the improvement of at least one valve arranged to reduce or annul fluid pressure difference between the two ends of the piston during travel of the piston over at least one predetermined portion of the travel path of the piston. In the embodiment illustrated there are two valves controlling fluid flow in a passage interconnecting chambers at the two ends of the piston, the valves having actuating arms engaged by a pin on a part moved by the piston. The valves are arranged to be opened to permit fluid flow through the passage at respective portions at opposite ends of the travel of the piston.

8 Claims, 8 Drawing Figures

SERVO-ASSISTED STEERING MECHANISM

BACKGROUND OF THE INVENTION

1. Field of the Invention

The present invention relates to improvements in or relating to servo-assisted steering mechanisms particularly such mechanisms employed in vehicles especially in heavy vehicles. The invention also relates to vehicles including such steering mechanisms.

2. Description of the Prior Art

In a known type of servo-assisted steering mechanism used in vehicles, a piston is moved in dependence on the steering movement when the mechanism is operated to change the steering and has opposite ends arranged in respective pressure chambers (the piston may for instance be a link in the chain of co-operating members bringing about the steering action). To provide servo-assistance to the steering, hydraulic fluid is selectively fed to one or other of the chambers from a source of pressurized fluid by a distributor actuated by operation of the steering gear, so as to urge the piston in the appropriate direction.

SUMMARY OF THE INVENTION

In the employment of a steering mechanism of this type, it has been found that it is frequently desirable, particularly for heavy vehicles, that it should be possible to reduce or totally annul the force of the assistance provided by the servo-mechanism when the steering gear is in a position which is disadvantageous for force transmission, for example at the regions corresponding to the end limits of the travel of the steering mechanism.

The present invention has as one object the provision of this possibility, preferably without increasing the dimensions of known steering mechanisms and preferably also without essentially modifying the characteristics of the main components of the latter so that for example the improvements may readily be introduced into a predetermined number of units in a manufacturing line without changing the programming of the line.

According to the invention, there is provided a servo-assisted steering mechanism in which a double-acting piston is moved in a travel path in dependence on the steering movement when the mechanism is operated and pressurized fluid is selectively fed to two spaces respectively at opposite ends of the piston so as to urge the piston in the appropriate direction in order to assist the steering movement, there being provided at least one valve operatively connected to at least one of said two spaces for causing, when actuated, at least reduction of fluid pressure difference between the said two spaces, the valve being arranged to be actuated in dependence on the position of the piston so as to cause said reduction of fluid pressure difference in at least one pre-determined portion of the travel path of the piston.

Preferably a passage interconnects the two spaces, or the two chambers which provide the said spaces and of which the opposite ends of the piston respectively provide walls, and the valve when actuated permits fluid flow along the passage to reduce the pressure difference. There may be two such valves, preferably both permitting fluid flow along the same passage when actuated, the two valves being actuated during travel of the piston over different pre-determined portions of its travel path.

Preferably the or each valve is biased towards the non-actuated condition, and has an actuating member which is arranged to be engaged to actuate the valve by a member which is moved in dependence on the steering movement of the mechanism.

The valve or valves may be adjustable for the purpose of varying that portion of the travel of the steering gear in which the valve or valves operate to reduce or annul the servo-assistance provided by the mechanism.

More specifically, the or each valve may have a first tubular member mounted, preferably so as to be angularly adjustable, in a wall of a first one of the said two chambers and having a port communicating the interior of the first member with the other of the said two chambers via the said passage and, fitted for fluid-tight rotation within the said first member, a second tubular member the interior of which communicates with the said first one of the two chambers, there being an aperture in the said second member capable of being brought into registration with the said port by rotation of the second member so as to permit fluid flow between the two chambers the said second member having a radial arm the free end of which is located in the travel path of a valve-actuating projection fast with a toothed sector member which is located in the said first one of the two chambers and is driven by a rack on the piston which co-operates with its toothing, the first member being surrounded by a torsion spring acting on the radial arm to bias the second member so as to keep the said aperture and port out of register, the said projection when actuating the valve moving the radial arm against the spring force to bring the said aperture and port into register. Preferably, the system comprises two valves of the type described, mounted to be engaged at respective end portions of the travel path of the actuating projection.

If desired, there may be provided slow-restricting means in the said passage which, when the valve is actuated, causes a residual pressure difference to be maintained between the two said chambers.

The invention also provides a vehicle having a servo-assisted steering mechanism in accordance with the invention as described above.

BRIEF DESCRIPTION OF THE DRAWINGS

The accompanying drawings show, by way of non-limitative example of the scope of the present invention and in diagrammatic form, a preferred mode of carrying the invention into effect. In the drawings.

DESCRIPTION OF THE PREFERRED EMBODIMENT

Figure 1:
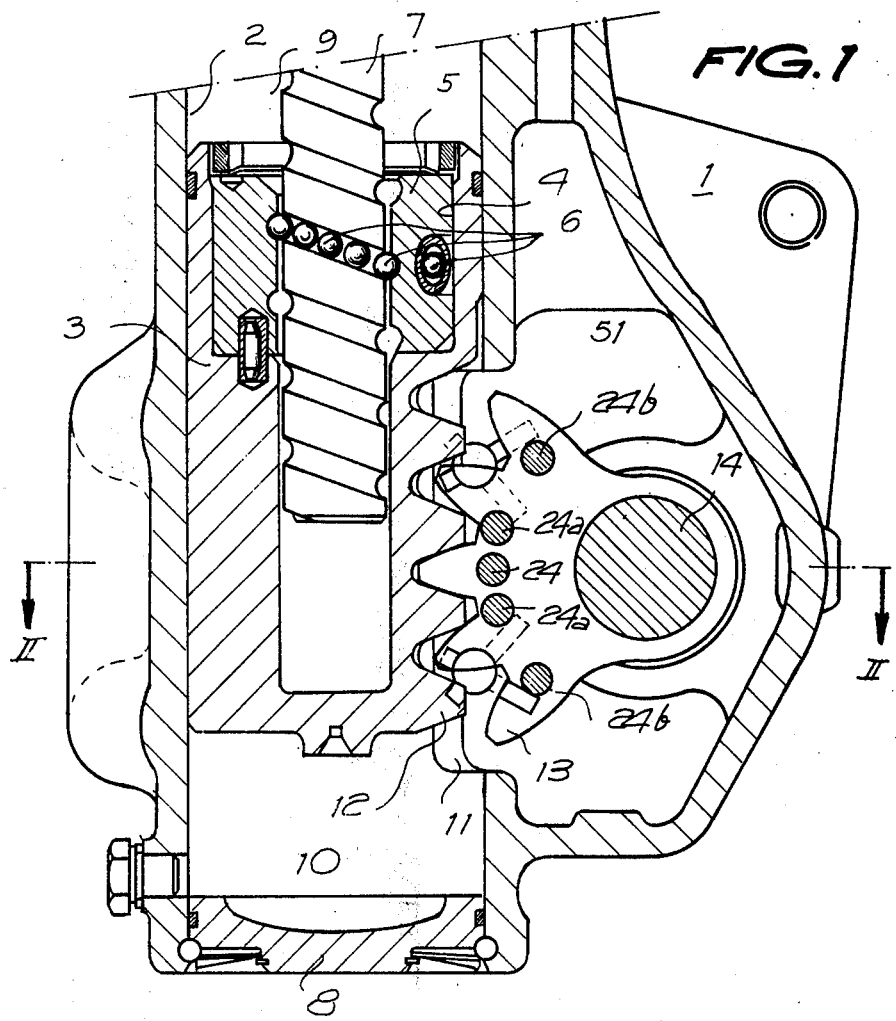
FIG. 1 is a partial longitudinal section through a steering box of a servo-assisted steering mechanism of the rack piston type, embodying the present invention.

A steering box illustrated in FIGS. 1 to 4 and generally designated 1 has a cylinder 2 within which slides a double-acting rack piston 3 formed at one end with a recess 4 in which is mounted a nut 5. Through the bore of the nut 5 a spindle 7 constituting the lower end of the steering rod of the vehicle. Running in grooves respectively on the spindle 7 and the nut 5 are anti-friction bearing means in the form of spherical balls 6. The spindle 7 is connected to the steering rod by means of a coupling device, having a conventional control valve (not shown) arranged to direct pressure oil against the one or other of the ends of the piston 3, as a function of the direction in which the steering wheel is actuated. For this purpose, the two ends of the cylinder 2 are sealed, e.g. by the lid 8 shown at the lower end, thereby forming two pressure chambers 9 and 10 separated by the piston 3. The lateral wall of the cylinder is formed with a lateral window 11 through which rack teeth 12 of the piston meshes with a complementary toothed sector 13 rigid with a shaft 14 projecting to the exterior of the box 1 through sealing devices 15 (see FIG. 2) to be connected in conventional manner to the external steering mechanism.

The shaft 14 is supported by anti-friction radial needle bearings 16 and an adjustable axial stop having a ball 17.

So far this description applies equally to a conventional mechanism. As mentioned, hydraulic fluid is supplied by conventional means selectively to the respective ends of the piston to urge it in the same direction as the steering movement being performed. In the illustrated arrangement the piston moves in a single cylindrical housing, which it at all times divides into two spaces or chambers (of varying size) for the hydraulic fluid. Alternatively the piston might have its opposite ends located in difference housings.

The box 1 has a lateral window 18 (FIG. 2) closed by a cover 19 carrying the anti-friction bearings 16 of the shaft 14 to one side of the sector 13 and secured in position by screws 20. On the cover 19 are mounted two valve devices 21, 22, having actuating means which are radial arms 23 (see especially FIGS. 3 and 4) located near one face of the sector 13. Secured to the latter, to project from the said face, is a pin or stud 24. The arrangement is such that in the neutral position of the steering gear the pin or stud 24 is located between the two arms 23 and out of engagement with them and the position of the arms 23 is such that they are actuated by said pin or stud 24 at the ends of the angular displacement of the sector, as will be perceived from the different positions 24, 24a, 24b of the pin 24 shown in FIG. 1.

Figure 4:
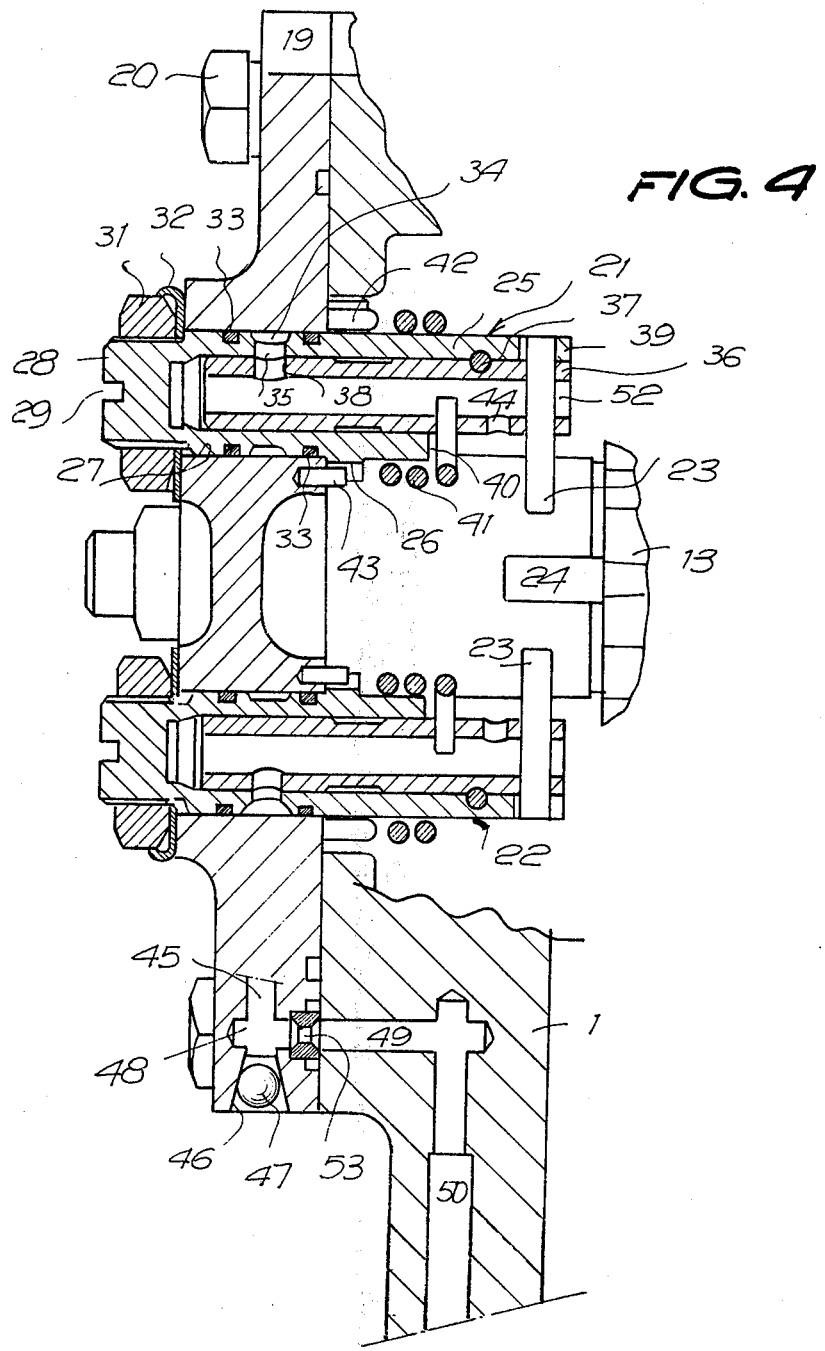
FIG. 4 is a section in a plane perpendicular to the plane of FIG. 3 and passing through the axes of the valves 21, 22.
Figure 5:
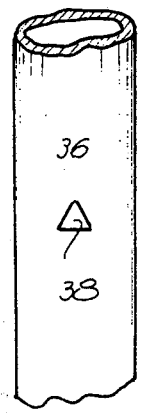
FIGS. 5 to 8 show, partially and in perspective, front valve members having different shapes of ports which may be employed in the valves of FIGS. 1 to 4.
Figure 6:
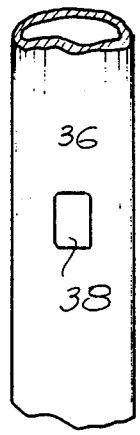
Figure 7:
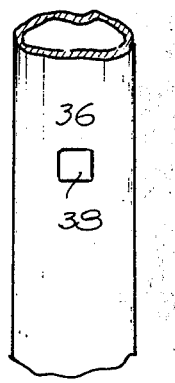
Figure 8:
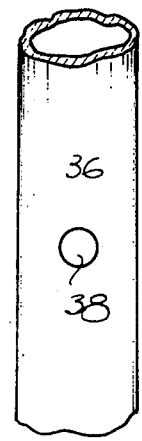

As is shown in FIG. 4, each of the valve devices 21, 22 has a tubular body member 25 provided on its exterior at a point intermediate its ends with a locating flange 26 which engages the inner wall of the cover 19 after the body 25 is passed into an orifice 27 formed in the cover 19. The body 25 has an outer "blind" end 28 formed with a diametrical slot 29 and a screwthread to receive a locknut 31 which, if necessary, may be sealed with the aid of securing means 32 made of sheet metal or of any other type. The body 25 has, in its portion lying in the thickness of the cover 19, two toroidal packings 33 mounted in associated grooves and axially separated in such manner that, on being fitted to the wall of the orifice 27, they afford a fluid-tight region therebetween; between the packings 33 is a wide external annular groove 34 and an orifice 35 establishing communication between the bottom of the groove and the interior of the tubular body 25.

Fitted for rotation within the tubular body 25 is a valve tube 36 axially located by means of a secant pin 37 extending through the body and located in a groove formed in the tube 36. The valve tube 36 is formed with a radial aperture or orifice 38 adapted to register (as will be described) with the orifice 35 in the body 25, and secured radially to the end of the tube 36 remote from the blind end 28 of the body is a pin constituting the arm 23 the body 25 being apertured at 39 and 40 to permit the rotational movement of the arm 23. Mounted around the body 25 is a helical spring 41 one end 42 of which is disposed in a recess formed in the flange 26 and the other end of which is bent radially inwardly is located in an associated orifice in the valve tube 36, so that the spring 41 biasses the tube 36 in one sense of rotation relative to the body 25.

In FIG. 4 for clarity the orifices 35 and 38 are shown in register but it is to be noted that the spring 41 biasses the valve device towards the inoperative position, in which the said orifices 35, 38 are out of register and which corresponds, in FIG. 1, to the positions of the arms 23 indicated by broken lines.

A stop pin 43 limits the end positions of angular adjustment of the valve device, and 44 designates an orifice providing for free discharge of the oil flowing through the valve during functioning.

Figure 2:
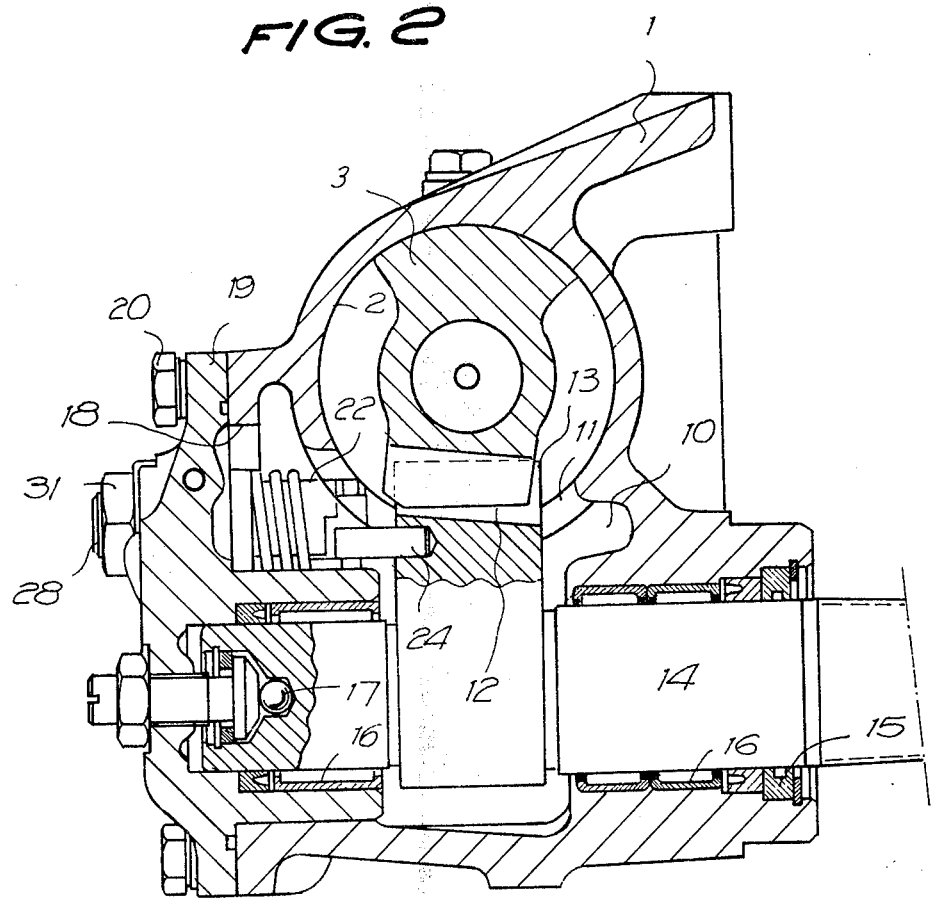
FIG. 2 is a cross section in the plane II—II of FIG. 1.
Figure 3:
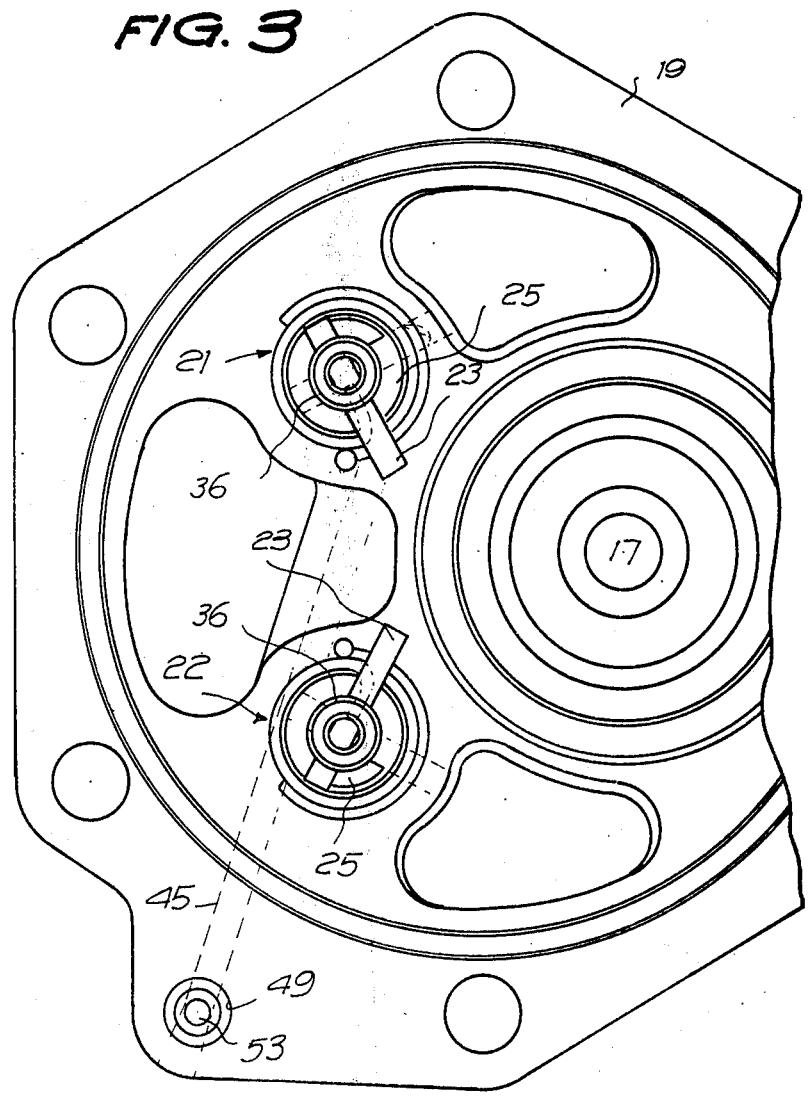
FIG. 3 is a view looking in the direction of FIG. 1 drawn to a larger scale onto the inner face of the cover 19 of the steering box shown in FIGS. 1 and 2, illustrating the valves 21, 22.

FIG. 2, 3 and 4 show that a bore or passage 45 extends through the cover 19 from a flaring mouth 46, which is adapted to be subsequently blocked by a plug 47, and intersects the two bores 27 containing the valves 21, 22 at the locations of the respective grooves 34. A transverse bore 48 communicates the bore 45 with a series of conduits 49 and 50 formed through the body of the box and debouching (in a manner which is not shown) into the upper chamber 9 of the cylinder; since the two valve devices described are disposed within and open at their inner ends into the chamber 51 which because of the window 11 constitutes a part of the lower chamber 10 it is clear that there is a potential communication via either valve between the two pressure chambers 9 and 10.

The mode of functioning of the illustrated embodiment will now be described.

It will be assumed that the main hydraulic valve (not shown) for controlling the servo-steering arrangement operates by supplying oil to the chamber 9 or to the chamber 10 depending on whether the spindle 7 is rotated clockwise or counter clockwise (i.e. as looking from above in FIG. 1), so as to assist the movement of the piston 3 over the desired distance. This conventional mode of functioning occurs during movement of the steering gear while the stop or pin 24 travels within the limits indicated by the two positions indicated at 24a in FIG. 1, in which positions the pin 24 is just contacting one or other of the arms 23.

If the piston moves so that the pin 24 passes one of the said positions 24a, the arm 23 which is engaged is rotated together with the associated valve tube 36 to bring the orifice 38, which is normally out of register with the orifice 35 due to the action of the spring 41, into register with the orifice 35, the amount of overlap of the orifices 35, 38 being greater or lesser depending on the magnitude of the displacement of the pin 24 from the positions 24a towards the end positions indicated at 24b in FIG. 1.

Registration of the orifices 35, 38 establishes communication between the bore 52 of the valve tube 36 and the ducts 45, 49 and 50. Consequently the chamber 51 which is part of the lower pressure chamber 10 is brought into communication with the upper chamber 9, in such manner that there results a reduction or annulment in the difference in pressure between the chambers 9, 10 and thus a reduction in the "assistance" force applied to the piston 3. The mode of functioning in both directions will be clear from the preceding general description.

Thus over predetermined end portions of the travel path of the piston, the valves 21, 22 are actuated to reduce or annul the fluid pressure difference between the two ends of the piston The mechanism described may be supplemented with acessory components to enhance its functioning in the practical conditions arising in each instance of use. For example, FIG. 4 shows in the mouth of the duct 48 flow-constricting means 53 which has the effect of creating a residual pressure in the discharged chamber. Alternatively one of the two orifices 35 and 38 may have various shapes e.g. such as shown on the tube 36 in FIGS. 5 to 8 for producing a desired variation in the manner of establishment of communication between the said chambers 9, 10 for example in order to prevent the occurrence of auto-oscillation.

It has been assumed that the two valves 21, 22 are actuated at the ends of the steering travel path, but it will be appreciated that in other embodiments the points of actuation could be located at any other suitable position so that the reduction of pressure between the two cylinder chambers can be arranged to take place at any desired points in the movement of the steering piston. In fact, this is already possible in the illustrated example, since, by loosening the nuts 31 and rotating the valves 21, 22 the arms 23 can be relocated in such manner that they are actuated at a different position, either earlier or later, by the control pin 24.

It will thus be seen that with the structure of the invention there is a cylinder means 2 providing at the opposite ends of the piston means 3 which is slidable therein the pressure chambers 9 and 10 one or the other of which is adapted to receive a fluid under pressure depending upon the steering direction. The piston means 3 has rack teeth which mesh with the teeth of the rotary gear sector 13 which in turn is fixed to the rotary shaft 14 which turns in one direction or the other to actuate the steering mechanism, so that the piston means 3, the gear sector 13, and the shaft 14 form components of a transmission means for transmitting steering controls to a steering mechanism, and it will be seen that one of these components, namely the sector 13 in the illustrated example, carries a control projection 24 which initially is in a neutral position from which it can move in either direction freely, which is to say without engaging any other parts. Each of the valve means 21 and 22 includes an outer cylinder and an inner sleeve rotatable therein with this inner sleeve of each valve means carrying a valve-actuating projection 23. These valve-actuating projections are situated on opposite sides of and in the path of movement of the control projection 24 so that one of the valve-actuating projections 23 will be engaged by the projection 24 after the latter has moved in one direction or the other beyond its neutral position through a given distance, and thereafter the continued movement of the control projection 24 will move the engaged valve-actuating projection to place the valve means 21 or 22, which is normally closed, in an open position for placing the chambers provided by the cylinder means 2 at the opposite ends of the piston means 3 in communication with each other so as to reduce the pressure differential between the chambers 9 and 10 and thus terminate the operation of the transmission means.

While the invention has been illustrated above by reference to one preferred embodiment and some variations thereof, it will be understood by those skilled in the art that various changes may be made without departing from the spirit and scope of the invention and it is intended to cover all such changes and modifications by the appended claims.

What is claimed is:

1. In a servo-assisted steering mechanism, piston means having a pair of opposed ends and cylinder means having a hollow interior in which said piston means is slidable with said cylinder means providing at said ends of said piston means a pair of pressure chambers, respectively, one or the other of which is adapted to receive pressure for driving said piston means in said cylinder means in one direction or the other depending upon the direction of steering, said piston means forming one of a number of components of a transmission means for transmitting movement of said piston means to a steering mechanism, said transmission means including a portion of said piston means which is formed with rack teeth, and said components of said transmission means including a rotary gear sector meshing with said rack teeth and a shaft fixed to said gear sector for rotary movement therewith in one direction or the other depending upon the direction of movement of said piston means in said cylinder means, one of said components of said transmission means carrying a control projection which initially has a neutral position beyond which said control projection can freely move in one direction or the other without engaging any other elements, and a pair of normally closed valve means for each providing when displaced to an open position communication between said chambers at said opposite ends of said piston for reducing a pressure differential between said chambers and thus terminating the operation of said transmission means, said pair of normally closed valve means respectively having connected thereto valve-actuating projections respectively situated on opposite sides of and in the path of movement of said control projection while being spaced from said control projection when the latter is in its neutral position, said control projection after moving in one direction or the other from its neutral position through a given distance engaging one of said valve-actuating projections for displacing the valve means connected thereto from its closed to its open position so as to provide communication between said chambers, so that until said control projection engages one of said valve-actuating projections said control projection can move freely without any restraint and after engaging one of said valve-actuating projections will continue to move until the valve means connected to the latter valve-actuating projection has been opened sufficiently to bring about a reduction in said pressure differential sufficient to terminate the operation of said transmission means.

2. The combination of claim 1 and wherein each of said valve means includes an outer sleeve and an inner sleeve coaxial with said outer sleeve and situated within and engaging said outer sleeve, said sleeves respectively being formed with ports which are out of registry with each other when said valve means is in its closed position and one of said sleeves being turnable about the common axis of said sleeves with respect to the other of said sleeves while a spring means is connected to said one sleeve for normally maintaining said ports out of registry with each other, said one sleeve of each valve means having said valve-actuating projection connected thereto and said control projection when engaging a valve-actuating projection turning said one sleeve of one of said valve means with respect to the other until said ports of the latter sleeves register with each other to place the valve means in an open position.

3. The combination of claim 2 and wherein said gear sector is the component of said transmission means which carries said control projection.

4. The combination of claim 3 and wherein said valve-actuating projections are respectively in the form of pins respectively situated on opposite sides of said control projection and respectively extending radially from said one sleeve of each valve means.

5. The combination of claim 4 and wherein an adjusting means is operatively connected with each valve means for adjusting the angular position of the pin forming the valve-actuating projection so as to regulate the distance through which said control projection can move before engaging one or the other of said valve-actuating projections.

6. The combination of claim 4 and wherein said valve-actuating projections are respectively connected with the inner sleeves of the pair of valve means while said outer sleeves thereof normally remain fixed.

7. The combination of claim 6 and wherein an adjusting means is operatively connected with at least one of said outer sleeves for adjusting the angular position thereof so as to adjust the position of one of said valve-actuating projections with respect to said control projection.

8. The combination of claim 4 and wherein said control projection is in the form of a pin which is parallel to said sleeves.

* * * * *